United States Patent
Wippermann et al.

(10) Patent No.: US 8,603,685 B2
(45) Date of Patent: Dec. 10, 2013

(54) METHOD FOR ELECTROCHEMICAL ACTIVATION OF FUEL CELLS

(75) Inventors: Klaus Wippermann, Jülich (DE); Heinz Schmitz, Jülich (DE); Jürgen Mergel, Jülich (DE); Andrei Kulikovsky, Nideggen-Abenden (DE); Dirk Uwe Sauer, Aachen (DE); Birger Fricke, Aachen (DE); Tilman Sanders, Aachen (DE)

(73) Assignees: Forschungszentrum Jülich GmbH, Jülich (DE); Rheinisch-Westfälisch-Technische Hochschule Aachen, Aachen (DE)

( * ) Notice: Subject to any disclaimer, the term of this patent is extended or adjusted under 35 U.S.C. 154(b) by 419 days.

(21) Appl. No.: 12/520,060

(22) PCT Filed: Dec. 5, 2007

(86) PCT No.: PCT/EP2007/010555
§ 371 (c)(1),
(2), (4) Date: Nov. 10, 2009

(87) PCT Pub. No.: WO2008/080494
PCT Pub. Date: Jul. 10, 2008

(65) Prior Publication Data
US 2010/0075182 A1    Mar. 25, 2010

(30) Foreign Application Priority Data
Dec. 20, 2006  (DE) .......... 10 2006 061 225

(51) Int. Cl.
*H01M 8/18* (2006.01)

(52) U.S. Cl.
USPC .......... 429/418; 429/407; 429/408; 429/422; 429/427; 429/428; 429/430; 429/443

(58) Field of Classification Search
USPC ......... 429/407, 408, 418, 422, 427–432, 443, 429/513
See application file for complete search history.

(56) References Cited

U.S. PATENT DOCUMENTS

| | | | | |
|---|---|---|---|---|
| 4,931,168 | A | * | 6/1990 | Watanabe et al. ............. 204/284 |
| 6,635,369 | B2 | | 10/2003 | Uribe |

(Continued)

FOREIGN PATENT DOCUMENTS

| | | |
|---|---|---|
| DE | 4027655 C1 | 10/1991 |
| DE | 69817396 T2 | 6/1999 |

(Continued)

OTHER PUBLICATIONS

Ye, Q., "Electrolytic Hydrogen Evolution in DMFCs Induced by Oxygen Interruptions and Its Effect on Cell Performance," Electrochemical and Solid-State Letters, vol. 8, No. 4, pp. A211-A214 (2005).

(Continued)

*Primary Examiner* — Patrick Ryan
*Assistant Examiner* — Ben Lewis
(74) *Attorney, Agent, or Firm* — International IP Law Group, PLLC

(57) ABSTRACT

There is provided a method for the activation of a fuel cell. An exemplary method comprises operating the fuel cell entirely or partially at least briefly in an electrolysis regimen during galvanic operation.

11 Claims, 4 Drawing Sheets

(56) References Cited

U.S. PATENT DOCUMENTS

| | | |
|---|---|---|
| 2004/0126632 A1 | 7/2004 | Pearson |
| 2006/0014060 A1 | 1/2006 | Sasaoka |
| 2006/0172159 A1* | 8/2006 | Kumar et al. .................. 429/13 |

FOREIGN PATENT DOCUMENTS

| | | |
|---|---|---|
| DE | 19815455 A1 | 10/1999 |
| DE | 19929472 A1 | 12/2000 |
| DE | 10220183 A1 | 11/2002 |
| EP | 0472922 A2 | 3/1992 |
| WO | WO9842038 A1 | 9/1998 |
| WO | WO9928985 A1 | 6/1999 |

OTHER PUBLICATIONS

Kulilovsky, A., "DMFC: Galvanic or Electrolytic Cell?", Electrochemistry Communications, vol. 8, No. 5, pp. 754-760 (2006).

International Search Report for PCT/EP2007/010555, Apr. 16, 2008.

* cited by examiner

METHOD FOR ELECTROCHEMICAL ACTIVATION OF FUEL CELLS

CROSS REFERENCE TO RELATED APPLICATIONS

Pursuant to 35 U.S.C. §371, this application is the United States National Stage Application of International Patent Application No. PCT/EP2007/010555, filed on Dec. 5, 2007, the contents of which are incorporated by reference as if set forth in their entirety herein, which claims priority to German (DE) Patent Application No. 10 2006 061 225.6, filed Dec. 20, 2006, the contents of which are incorporated by reference as if set forth in their entirety herein.

BACKGROUND

The activating effect of oxygen depletion at the cathode was already recognized by scientists in Los Alamos in the United States and recently published by Christian Eickes, Piotr Piela, John Davey and Piotr Zelenay, "Recoverable Cathode Performance Loss in Direct Methanol Fuel Cells", Journal of The Electrochemical Society, 153/1 (2006) A171-A178.

The method described there as the "air break" method functions in a sequence of four consecutive steps: 1) stopping the air feed on the cathode side, 2) immediately switching over to a galvanostatic mode of operation in which the same current is set that was being generated at the moment of the switching over, 3) switching on the air feed as soon as a critical minimum cell tension has been reached, 4) immediately switching over to the potentiostatic mode of operation.

In their experiment, Eickes el al. (see above) apply the activation method every 10 minutes, and interrupt the air flow for 13 seconds each time. The current density and thus the cell performance rise by about 15% after each activation under the applicable test conditions. The authors ascribe the activation effect to a reduction of the platinum oxide at the cathode that forms on the surface of the catalyst during the fuel cell operation and impairs the catalysis of the oxygen reduction. The reduction takes place due to the low cathode potential during the activation period of 13 seconds.

In this publication, no statements are made about an electrolysis regimen or about a bi-functional regimen, nor are any possible activation effects due to electrolysis discussed.

SUMMARY OF THE INVENTION

An exemplary embodiment of the present invention relates to a method for the electrochemical activation of fuel cells, especially of direct methanol fuel cells.

Exemplary embodiments of the present invention relate to the effective operation of a fuel cell, especially a direct methanol fuel cell. In particular, it is desirable to operate it more effectively than has been possible so far according to the state of the art.

An exemplary embodiment of the present invention relates to the fact that the current generation can be increased and thus the performance of a fuel cell can be improved by briefly activating individual fuel cells or parts of fuel cells.

The term activation of the fuel cell as set forth herein refers especially to procedures during their operation. In particular, these are operating states in which current is being consumed in at least one cell region.

In this manner, an exemplary embodiment of the present invention can be distinguished from the familiar production activation process. The familiar production activation process is the last step in the production of high-temperature fuel cells SOFC (Solid Oxide Fuel Cell). This production activation process influences the later performance and service life of the cells.

The term activation as set forth herein means that the fuel cell or parts of the fuel cell are activated during the operation. The result is that the ageing process, which a fuel cell is normally subject to, can be at least partially compensated for, at times even overcompensated.

A refinement of an exemplary embodiment of the present invention comprises a mechanism for the activation that is based on an improvement of the electrochemical activity of the catalyst and/or even an improvement of the mass transfer in the catalyst layers.

Refinements of an exemplary embodiment of the present invention provide that, during the usual galvanic operation over the course of which the fuel cell is generating current, a fuel cell or at least parts of a fuel cell are briefly operated in the electrolysis regimen.

This means that, in at least part of the fuel cell or in the entire fuel cell, electrolysis takes place briefly, i.e. water decomposition with energy consumption.

In an advantageous exemplary embodiment of the method according to the invention, a fuel cell is provided with an optionally small, preferably external power source. This power source is capable of briefly supplying the fuel cell with an electrolysis current during operation. This current can advantageously be in the range from 1 to 50 $mA/cm^2$.

The term "briefly" refers especially to periodical time intervals of 1 sec to 100 seconds for each hour of operation or, as an alternative, preferably 0.5 minutes to 5 minutes for each hour of operation.

It is advantageous for the fuel cell to be operated at a low load current and below a critical oxidant flow rate in such a way that a galvanic regimen is established in the area of the oxidant inlet of the fuel cell, and that an electrolysis regimen is established in the area of the oxidant outlet of the fuel cell.

The oxidant flow rate refers to the flow rate of the oxidant at the cathode. The unit is typically expressed in mL/minute.

The critical oxidant flow rate refers to a critical flow rate of the oxidant at the cathode below which a bi-functional regimen occurs and an activation takes place. Here again, the unit is typically mL/minute.

In a fuel cell stack, the activation of the cells could fundamentally take place either simultaneously or individually, i.e. sequentially. However, the activation of individual cells would only be possible if one could regulate the air feed to each cell individually. However, this is too complex in actual practice, so that a simultaneous activation of all of the cells has to take place.

In another advantageous exemplary embodiment of the method according to the invention, a fuel cell is operated in a bi-directional operating state. This means that a part, especially the front cell area that is located near the oxidant inlet, is operated in a galvanic regimen, i.e. current is produced. At the same time, at the back part of the cell, which is near the oxidant outlet, current is consumed at the anode for purposes of hydrogen generation. This operating state is also called the electrolysis regimen.

Typical bi-directional operating states are established in a direct methanol fuel cell, for example, when, at low electric currents, an air flow is set that is equal to or less than the critical air flow.

The critical air flow rate $f_{crit}$ at which a negative (electrolysis) current occurs at the outlet of the air channel can be calculated with the following equation:

$$f_{crit} = \frac{A(J_{cross} + J)}{4Fc_{ox}^0}$$

Here, A is the active surface area of the cell (cm$^2$), $J_{cross}$=6F$N_{cross}$ is the average, equivalent current density of the methanol permeation (A cm$^{-2}$), $N_{cross}$ is the average molar methanol flow through the membrane (mol cm$^{-2}$ s$^{-1}$), J is the mean current density in the cell (A cm$^{-2}$), F is the Faraday constant (9.65' 10$^4$ Coulomb mol$^{-1}$), and $c_{ox}^0$ is the molar oxygen concentration at the inlet of the air channel (mol cm$^{-3}$).

For the parameters indicated in Table 1, for example, when A=100 cm$^2$, $J_{cross}$=0.1 A cm$^{-2}$, J=0.2 A cm$^{-2}$, and $c_{ox}^0$=7.22*10$^{-6}$ mol cm$^{-3}$, one obtains a flow rate $f_{crit} \gg$ 11 cm$^3$ s$^{-1}$, corresponding to 660 mL min$^{-1}$.

The $c_{ox}^0$ value in Table 1 corresponds to the atmospheric pressure at a temperature of 350 K.

As the result of the experiments carried out so far, the invention can be summarized as follows:

The energy loss in the electrolysis envisaged according to an exemplary embodiment of the present invention is virtually negligible, i.e. the result is a balance yield of almost 100%. The balance yield corresponds to the remaining energy yield in the case of activation after the subtraction of the portion of the electric energy consumed during the electrolysis. The energy yields and losses can be calculated on the basis of the amounts of charge that are obtained during the period between two activation cycles or that are consumed during the electrolysis.

In the case of an activation by reducing the air flow instead of by using external electrolysis, the estimated energy loss is even less since only a low electric current flows in order to change the mass flows and the current density. Therefore, a balance yield of almost 100% can likewise be expected.

DETAILED DESCRIPTION OF SPECIFIC EMBODIMENTS

Preferred exemplary embodiments of the invention will be explained by way of an example below with reference to embodiments as well as to the figures and to a table, without the subject matter of the invention being in any way limited by this.

Figure 1:
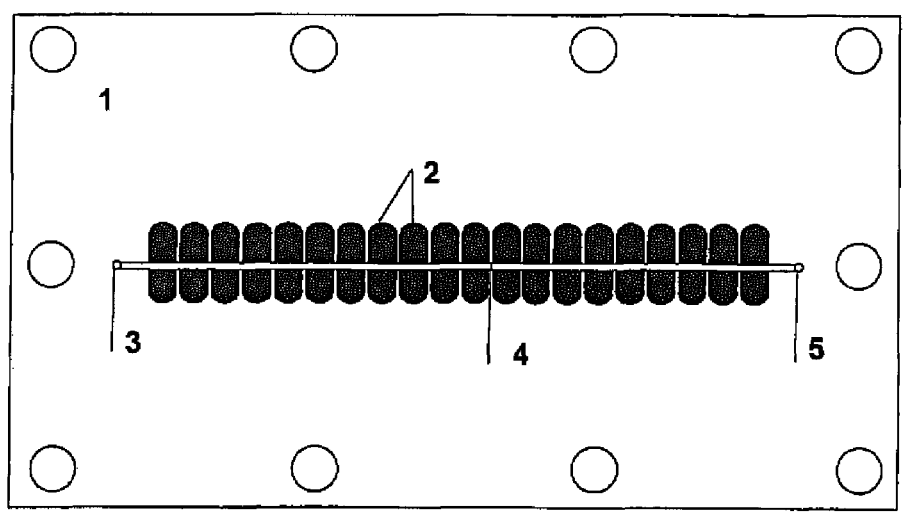
FIG. 1 is a schematic depiction of a direct methanol fuel cell (DMFC) according to an exemplary embodiment of the present invention.

FIG. 1 shows the diagram of a direct methanol fuel cell (DMFC) in which the media distribution at the anode and at the cathode takes place via a channel in each case and the current discharge along the channel is divided over 20 graphite segments that are insulated from each other. The media distribution at the anode can be seen here as an example. In this manner, printed circuit board technology can be used to measure the current distributions in the fuel cell along the channel.

The DMFC contains a membrane-electrode unit (membrane-electrode assembly) consisting of at least one membrane, at least one catalyst layer and at least one diffusion layer. Each of these layers fulfills special tasks in the DMFC. The interaction of the layers in the MEA is selected with an eye towards the intended areas of application. The production parameters and the best-suited materials for the production process of the layers are selected on the basis of a requirement list. The MEA thus created can then be tested in a series of test benches in terms of its performance.

Preferably, the fuel cell shown in FIG. 1 contains a polysulfone plate 1, graphite segments 2, a channel inlet 3, a flow channel 4 and a channel outlet 5.

Moreover, according to an exemplary embodiment of the present invention, a DMFC is provided that can be produced with a small production effort and with which the specific performance and long-term stability are improved.

Figure 2:
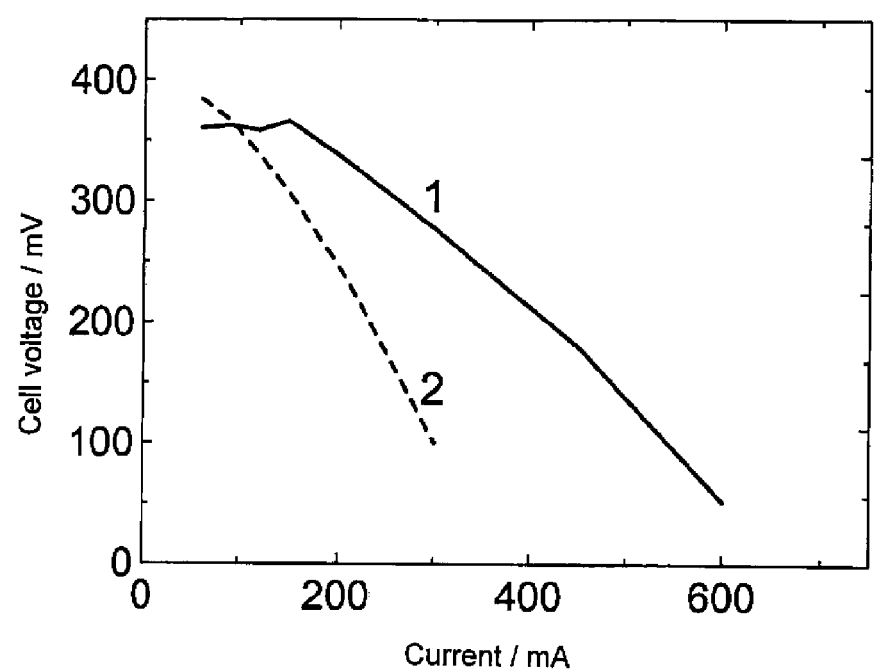
FIG. 2 is a graph showing current/voltage characteristic curves of a direct methanol fuel cell according to an exemplary embodiment of the present invention.

FIG. 2 shows measured current/voltage characteristic curves for a direct methanol fuel cell according to an exemplary embodiment of the present invention before and after an activation according to the invention. The test result reveals that the cell performance can be markedly improved if every single segment is operated for 10 seconds at a time with an external power source at a low electrolysis current of approximately 2 mA. Consequently, the electrolysis leads to an activation of the cell.

In this context, the curves show the following:
1: current/voltage characteristic curve before the activation,
2: current/voltage characteristic curve after the activation.

FIGS. 3(a) and 3(b) show an exemplary embodiment of the internal electrochemical self-activation of a direct methanol fuel cell that takes place if, during the fuel cell operation, the fuel cell is operated at a low load current and at a low flow rate. Under these conditions, the fuel cell is in a bi-functional operating state, that is to say, the front cell area near the air inlet is generating current (galvanic regimen) whereas the remaining, rear cell area is consuming current at the anode in order to generate hydrogen (electrolysis regimen).

FIGS. 3(a) and 3(b) show the distributions of the local current along the air channel for three air flow rates at, for example:
1: air flow rate=1 mL/min.
2: air flow rate=2 mL/min.
3: air flow rate=3 mL/min.

FIG. 3(a) shows that the segments 1 to 7 are being operated in the galvanic regimen, in other words, they are producing current, which can be seen by the positive current values. In all three of the set air flow rates, segments 13 to 20 in FIG. 3(a) are in the electrolysis regimen, which can be seen by the negative current values. As the air flow rate decreases, the electrolysis regimen expands more and more towards the air inlet all the way to segment 8 at the lowest flow rate of 1 mL/min.

Figure 3:
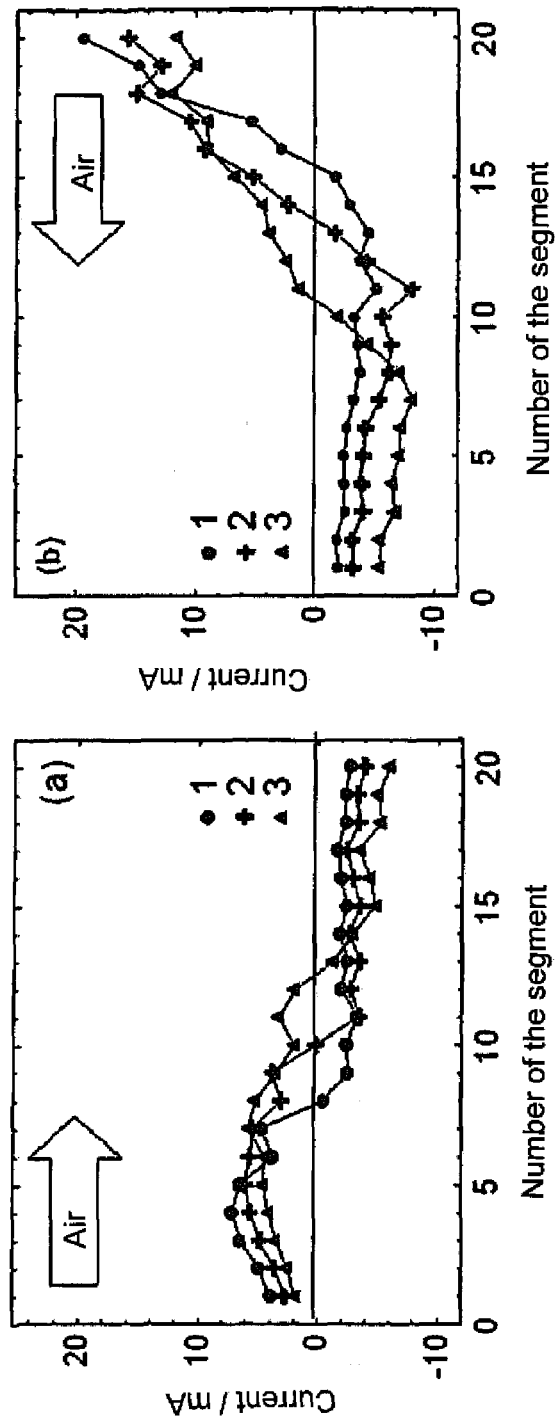
FIG. 3 is a set of graphs 3(a) and 3(b) showing the operation of an internal electrochemical self-activation of a direct methanol fuel cell according to an exemplary embodiment of the present invention.

The activating effect of the electrolysis is evident in FIG. 3(b), when the direction of the air flow is reversed, i.e. if the air is let in upstream from segment 20. If the direction of the air flow through the cell is changed or reversed, the first segments are now in the electrolysis regimen, while the rear segments are being operated in the galvanic regimen. It is noticeable that the activated segments 8 to 20, which were previously being operated in the electrolysis regimen, now produce a considerably higher current in comparison than the non-activated segments 1 to 7 in FIG. 3(*a*).

A conceivable cause of the activation could be an improvement in the electrochemical activation of one or both catalysts and/or of the mass transfer in the catalyst layers of the direct methanol fuel cell.

Within the scope of an exemplary embodiment of the present invention, it was also found that the activation of the fuel cell can depend, among other things, on the individual geometry of the fuel cell. In this manner, under actual practice conditions, it has proven that the activation effect in an individual channel cell diminishes substantially earlier than in a square cell. The tables list a number of test results pertaining to the activation (Table 1) and to the energy balance (Table 2) of these two cells—which can be considered to be boundary cases—said cases simultaneously serving to indicate the upper and lower limits for these values.

Figure 4:
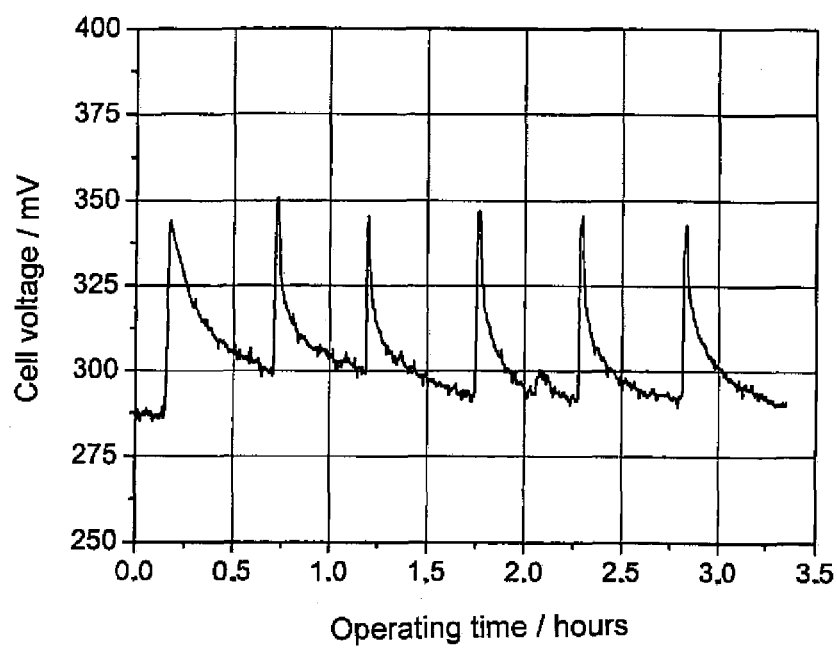
FIG. 4 is a graph showing an activation according to an exemplary embodiment of the present invention, in a segmented single-channel cell.

Therefore, on the basis of these results, the following ranges are proposed for the activation:

activation duration: $t_{act}$=10 to 500 s
interval duration: $t_{int}$=0.5 to 200 h FIG. 4 presents another exemplary embodiment of the activation according to the invention in a segmented single-channel cell (see Table 1). In this experiment, the membrane-electrode assembly (MEA) of this fuel cell was operated by periodically lowering the air flow from 7 mL/min to 3 mL/min and by lowering the load current from 150 mA to 10 mA each time for an interval duration of 30 seconds every 30 minutes. This means that the cell was switched to the electrolysis regimen at a time ratio of 1:60. The initial voltage is at first markedly increased after each activation and then drops slowly back to its original value. By selecting appropriate time intervals, the voltage or current generation can be altogether markedly increased. In this exemplary embodiment, a direction change of the oxidant is likewise not possible and likewise not necessary.

A direction change is advantageous for increasing the fraction of the activated volume but, as explained, is not necessary.

Figure 5:
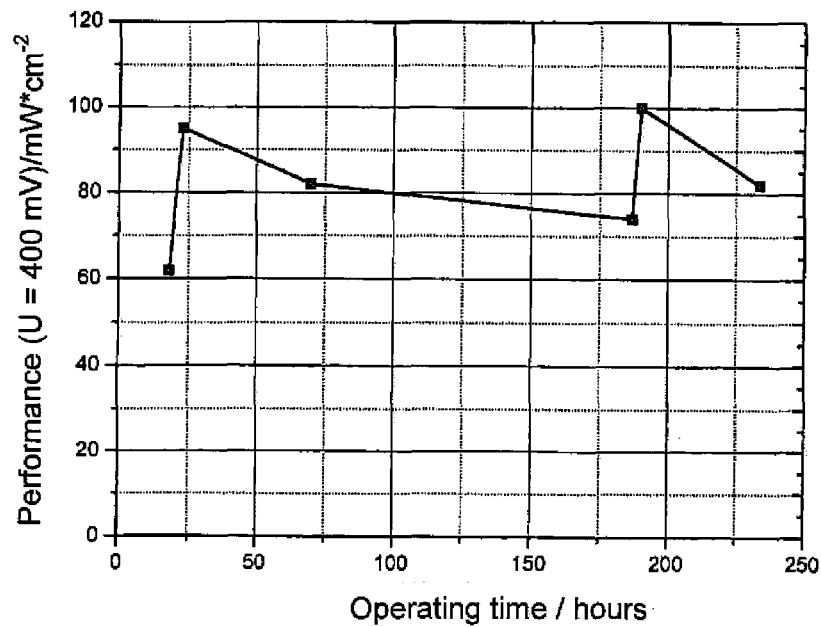
FIG. 5 is a graph showing an activation according to an exemplary embodiment of the present invention in a square cell with a foot structure of the gas distribution plate.

FIG. 5 shows the activation according to an exemplary embodiment of the present invention in a square cell with a foot structure of the gas distribution plate (see table 1). In this case, the membrane-electrode assembly (MEA) of this fuel cell was operated by periodically lowering the air flow from 185 mL/min to 25 mL/min and by lowering the load current from 2.5 A to 60 mA for an interval duration of 400 seconds every 170 hours. In this case, this means that the cell was switched to the electrolysis regimen at a time ratio of 1:1530. In this experiment as well, the initially increased voltage also decreases slowly after the activation but, after 170 hours, has not yet reached its original value again.

LIST OF REFERENCE NUMBERS

FIG. 1:
1: polysulfone plate
2: graphite segments
3: channel inlet
4: flow channel
5: channel outlet
FIG. 2:
1: current/voltage characteristic curve before the activation
2: current/voltage characteristic curve after the activation
FIG. 3:
1: air flow rate=1 mL/min.
2: air flow rate=2 mL/min.
3: air flow rate=3 mL/min.

TABLE 1

| | | Activation | | | | Operation | | | |
|---|---|---|---|---|---|---|---|---|---|
| Measuring cell | T/C. ° [° F.] | current [mA/cm$^2$] | air flow [mL/min] | methanol flow [mL/hour] | duration [s] | current [mA*cm$^{-2}$] | $\lambda_{air}$ | $\lambda_{methanol}$ | time interval [h] |
| a) segmented single-channel cell (electrode surface area of 3 cm$^2$) | 80° C. [176° F.] | 3.3 | 3 | 6 | 30 | 50 | 4 | 4 | 0.5 |
| b) square cell (electrode surface area of 18 cm$^2$) | 80° C. [176° F.] | 3.4 | 25 | 60 | 400 | 142 | 4 | 4 | 170 |

TABLE 2

| | Activation frequency | | Energy balance | | |
|---|---|---|---|---|---|
| Measuring cell | activation duration $t_{act}$ [s] | interval duration $t_{int}$ [h] | energy yield $E_{BZ}$ [J/cm$^2$] | energy loss a. $E_{EZ}$ [J/cm$^2$] | $E_{BZ}/E_{EZ}$ [%] |
| a) segmented single-channel cell (electrode surface area 3 cm$^2$) | 30 | 0.5 | 4.7 | 0.015 | 0.3 |
| b) square cell (electrode surface area 18 cm$^2$) | 400 | 170 | 4320 | 0.2 | 0.005 |

What is claimed is:

1. A method for the activation of a fuel cell, the method comprising:
   periodically operating the fuel cell partially in an electrolysis regimen at least briefly during continuous galvanic operation,
   wherein the fuel cell is operated below a critical oxidant flow rate calculated for given conditions comprising a surface area of the fuel cell, the current density of alcohol permeation, the average molar alcohol flow through a cell membrane, and a mean current density in the fuel cell, wherein the load current is consequently lowered so that galvanic process is established in an area of an oxidant inlet of the fuel cell, and that
   an electrolysis process is established in an area of an oxidant outlet of the fuel cell,
   whereby a direction of oxidant flow is periodically reversed.

2. The method recited in claim 1, comprising activating at least one additional fuel cell within a fuel cell stack by the method according to claim 1.

3. The method recited in claim 1,
wherein the direction of the oxidant flow is periodically reversed in the range from 1 to 100 seconds.

4. The method recited in claim 1, wherein the direction of the oxidant flow is periodically reversed in the range from 30 to 60 seconds.

5. The method recited in claim 1, wherein the fuel cell comprises a direct methanol fuel cell.

6. A method for the activation of a fuel cell, the method comprising:
periodically operating the fuel cell partially in an electrolysis regimen at least briefly during continuous galvanic operation, whereby the fuel cell is periodically operated below a critical oxidant flow rate calculated for given conditions comprising a surface area of the fuel cell, the current density of alcohol permeation, the average molar alcohol flow through a cell membrane, and a mean current density in the fuel cell, wherein the load current is consequently lowered in such way that a galvanic regimen is established in an area of an oxidant inlet of the fuel cell; and
establishing an electrolysis process in an area of an oxidant outlet of the fuel cell.

7. The method recited in claim 6, wherein the fuel cell comprises a direct methanol fuel cell.

8. The method recited in claim 6, comprising activating at least one additional fuel cell within a fuel cell stack by operating the at least one additional fuel cell entirely or partially in an electrolysis regimen process at least briefly during galvanic operation, whereby a direction of oxidant flow is periodically reversed.

9. The method recited in claim 8, wherein the direction of the oxidant flow is periodically reversed in the range from 30 to 60 seconds.

10. The method recited in claim 6, wherein the fuel cell is adapted to operate entirely or partially in an electrolysis regimen at least briefly during galvanic operation and to periodically reverse a direction of oxidant flow into and out of the fuel cell.

11. The method recited in claim 6 comprising activating the fuel cell by periodically operating the fuel cell entirely or partially in an electrolysis regimen process at least briefly during galvanic operation, whereby a direction of oxidant flow is periodically reversed.

* * * * *